(12) United States Patent
Burt et al.

(10) Patent No.: US 8,340,629 B2
(45) Date of Patent: Dec. 25, 2012

(54) METHOD OF CONTACTING A PSAP

(75) Inventors: Wylie R. Burt, Plymouth, MI (US); Wiliam A. Sedat, Orchard Lake, MI (US)

(73) Assignee: General Motors LLC, Detroit, MI (US)

( * ) Notice: Subject to any disclaimer, the term of this patent is extended or adjusted under 35 U.S.C. 154(b) by 402 days.

(21) Appl. No.: 12/557,582

(22) Filed: Sep. 11, 2009

(65) Prior Publication Data

US 2011/0065416 A1 Mar. 17, 2011

(51) Int. Cl.
*H04M 11/04* (2006.01)
(52) U.S. Cl. ............... 455/404.2; 455/404.1; 455/550.1; 455/541; 455/456.1; 455/456.2; 455/403; 455/63.1; 340/429; 340/426.12; 340/426.1
(58) Field of Classification Search .................. 455/418, 455/437, 466, 439, 99, 456.1, 404.2, 440; 455/423, 455, 427, 343.2; 379/37, 45, 210.02, 379/196, 230
See application file for complete search history.

(56) References Cited

U.S. PATENT DOCUMENTS

| | | | | |
|---|---|---|---|---|
| 5,808,565 A * | 9/1998 | Matta et al. | .................... | 340/994 |
| 5,960,341 A * | 9/1999 | LeBlanc et al. | ............. | 455/426.1 |
| 6,026,345 A * | 2/2000 | Shah et al. | ..................... | 701/117 |
| 6,088,648 A * | 7/2000 | Shah et al. | ..................... | 701/117 |
| 6,741,863 B1 * | 5/2004 | Chiang et al. | ............... | 455/456.1 |
| 7,643,625 B2 * | 1/2010 | Pearson | .................... | 379/201.01 |
| 2003/0036847 A1 * | 2/2003 | Geier et al. | ..................... | 701/209 |
| 2003/0054837 A1 * | 3/2003 | Ennis | ............................. | 455/456 |
| 2003/0069691 A1 * | 4/2003 | Schroeder | ...................... | 701/213 |
| 2003/0109245 A1 * | 6/2003 | McCalmont et al. | ......... | 455/404 |
| 2004/0058678 A1 * | 3/2004 | deTorbal | ........................ | 455/437 |
| 2004/0184584 A1 * | 9/2004 | McCalmont et al. | ........... | 379/45 |
| 2004/0224682 A1 * | 11/2004 | Kang | ............................. | 455/433 |
| 2005/0243974 A1 * | 11/2005 | Pearson | ......................... | 379/37 |
| 2006/0068753 A1 * | 3/2006 | Karpen et al. | ............. | 455/404.2 |
| 2007/0041368 A1 * | 2/2007 | Lorello | ......................... | 370/352 |
| 2007/0041513 A1 * | 2/2007 | Gende | ............................. | 379/37 |
| 2008/0065628 A1 * | 3/2008 | Bansal et al. | ..................... | 707/6 |
| 2008/0143709 A1 * | 6/2008 | Fassero et al. | ................ | 345/419 |
| 2008/0189226 A1 * | 8/2008 | Wurster | ......................... | 705/417 |
| 2008/0311881 A1 * | 12/2008 | Taaghol et al. | ............ | 455/404.2 |
| 2009/0271110 A1 * | 10/2009 | Sugiura | ......................... | 701/208 |
| 2010/0136947 A1 * | 6/2010 | Yoo et al. | .................... | 455/404.2 |
| 2010/0153165 A1 * | 6/2010 | Kosseifi et al. | ..................... | 705/9 |
| 2011/0053575 A1 * | 3/2011 | Veliu et al. | ..................... | 455/418 |
| 2011/0098028 A1 * | 4/2011 | Economos et al. | ........... | 455/418 |
| 2011/0144911 A1 * | 6/2011 | Madhavan et al. | ............ | 701/214 |

* cited by examiner

*Primary Examiner* — Joseph Arevalo
(74) *Attorney, Agent, or Firm* — Anthony Luke Simon; Reising Ethington P.C.

(57) ABSTRACT

A method of contacting a public safety answering point (PSAP) that includes determining the location of a vehicle, communicating the location of the vehicle to a PSAP location service, identifying a PSAP proximate to the location of the vehicle, determining a direct inward dialing (DID) number associated with the identified PSAP, communicating the DID number to the call center from the PSAP location service, contacting the identified PSAP using the DID number, and transmitting the DID number of the identified PSAP and the location of the vehicle to the PSAP.

18 Claims, 3 Drawing Sheets

METHOD OF CONTACTING A PSAP

TECHNICAL FIELD

The present invention relates generally to wireless communications and more particularly identifying PSAPs for wireless subscribers.

BACKGROUND OF THE INVENTION

Increasingly, vehicle manufacturers outfit their vehicles with a wide array of wireless communications capabilities. Telematics devices installed in modern vehicles can wirelessly send both voice and data communications to a variety of recipients. Similar capabilities can be found on hand-held wireless devices. Recipients can be central facilities that include servers and/or live advisors capable of meeting an owner's needs. Additionally, vehicles have the ability to gather a diverse array of data about vehicle status and send it via the telematics device. However, during emergencies, telematics subscribers may connect with an administrative telephone number and not the main 911 trunk lines. This can slow emergency response time curtailing the usefulness of this data. And the telematics device may be limited to sending data to the call center during an emergency, which may limit its usefulness.

SUMMARY OF THE INVENTION

According to an aspect of the invention, there is provided a method of contacting a public safety answering point (PSAP). The method includes determining the location of a vehicle, communicating the location of the vehicle to a PSAP location service, identifying a PSAP proximate to the location of the vehicle, determining a direct inward dialing (DID) number associated with the identified PSAP, communicating the DID number to the call center from the PSAP location service, contacting the identified PSAP using the DID number, and transmitting the DID number of the identified PSAP and the location of the vehicle to the PSAP.

According to another aspect of the invention, there is provided a method of contacting a PSAP. The method includes determining the latitude and longitude coordinates of a vehicle, establishing a virtual polygonal area surrounding the vehicle based on the latitude and longitude coordinates of the vehicle, locating one or more PSAPs within the polygonal area using a point-in-polygon search method, obtaining a PSAP identification for each located PSAP, sending the PSAP identification to one or more of a primary carrier or a call center, and connecting the call center to a PSAP within the polygonal area.

According to yet another aspect of the invention, there is provided a method of contacting a PSAP. The method includes determining the latitude and longitude coordinates of a vehicle, identifying a PSAP within a predetermined range of the latitude and longitude coordinates, calling a direct inward dialing (DID) number corresponding to the identified PSAP, transmitting voice communications and a pseudo automatic number identification (P-ANI) corresponding to the identified PSAP from a call center using a voice channel based on the called DID number, notifying a wireless carrier of the DID number corresponding to the identified PSAP, the transmitted P-ANI, and the latitude and longitude of the vehicle using a data channel, and receiving the notification at the wireless carrier.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below locates a public service access point (PSAP) and interconnects a telematics device or wireless device with the located PSAP through a call center. During the interconnection aspect of the method, the call center can act as an intermediary between the telematics device and the PSAP. Acting as an intermediary can include contacting a PSAP and conveying a voice call received from the telematics device to the identified PSAP. Additionally, the intermediary roll of the call center can include obtaining data from the telematics device or the wireless device, determining whether the caller would benefit from emergency services, and, using a data connection, passing the obtained data to the PSAP and the voice call of the caller to the PSAP. Obtaining data can involve several actions. For instance, it can include obtaining the location of the vehicle, telematics device, or wireless device. Obtaining data can also include a PSAP location service that determines the most appropriate PSAP with which to connect the telematics unit or wireless device. And obtaining data can also include determining a PSAP identification number, such as a pseudo automatic number identifier (P-ANI) or direct inward dialing (DID) number associated with an identified PSAP and sending it over the data connection to an appropriate PSAP. While the terms telematics device and wireless device are used separately above, the embodiment(s) described below are described with respect to a telematics device.

Figure 1:
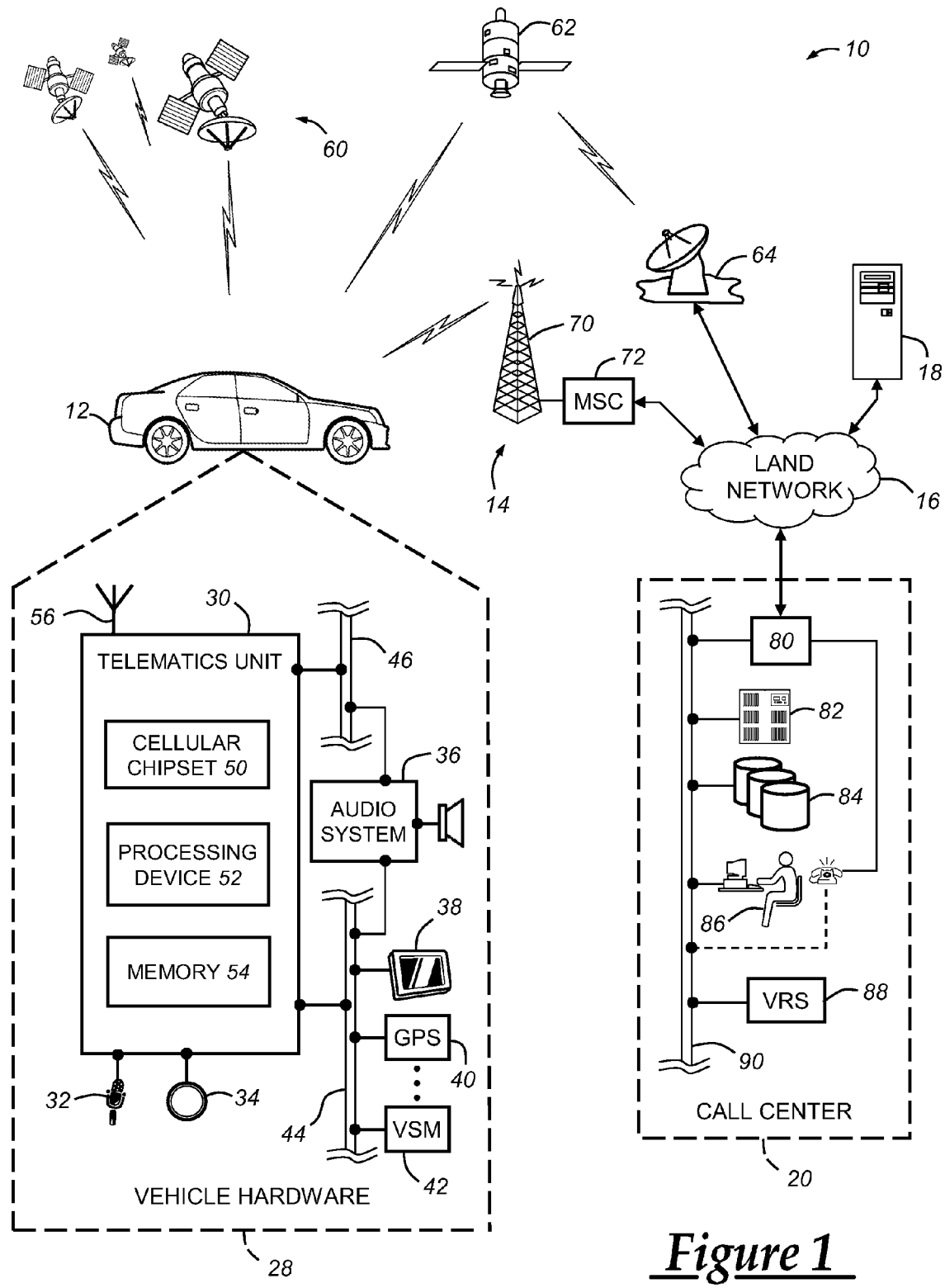
FIG. 1 is a block diagram depicting an exemplary embodiment of one aspect of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database

84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
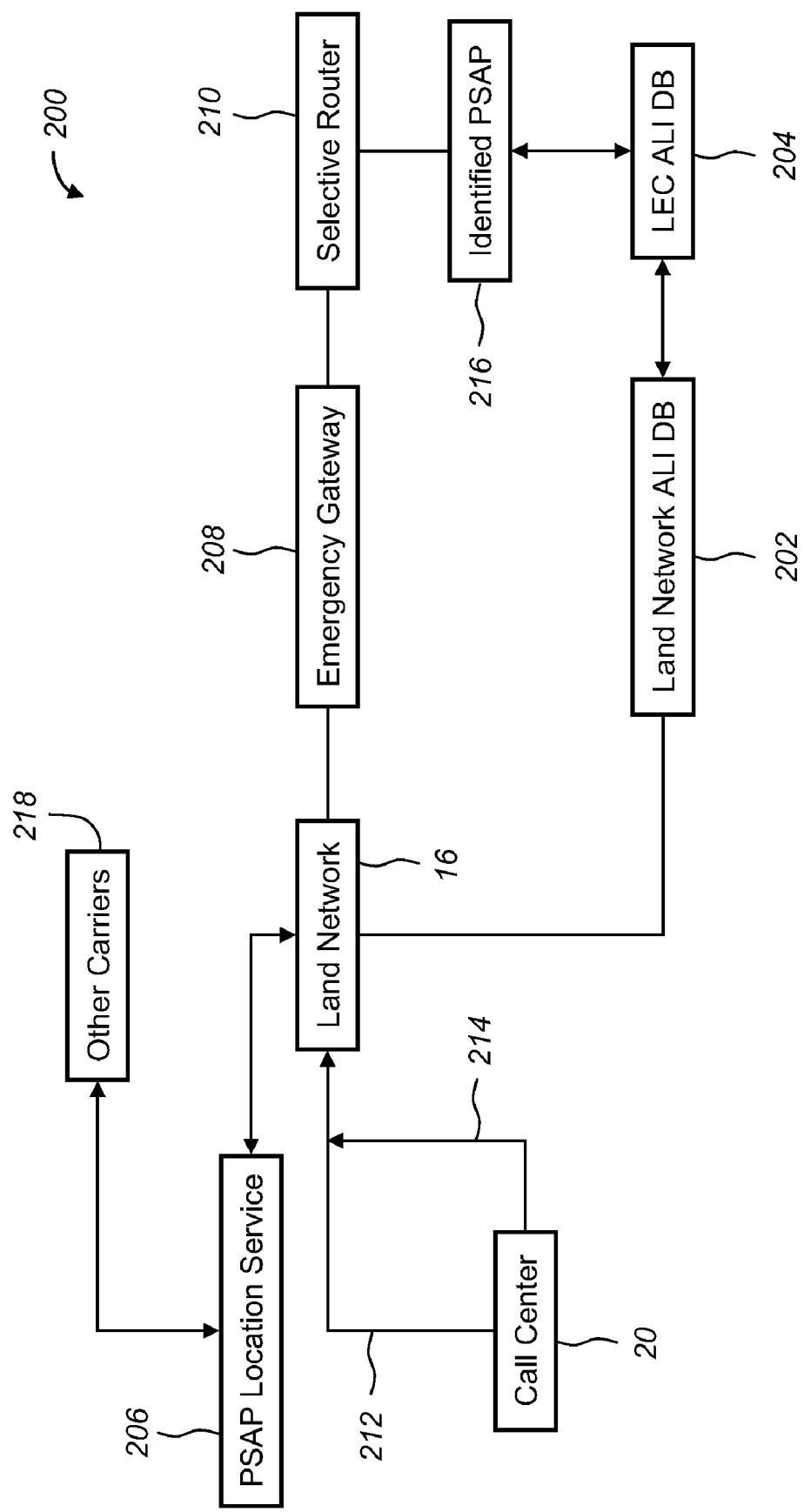
FIG. 2 is a block diagram depicting an exemplary embodiment of another aspect of a communications system that is capable of utilizing the method disclosed herein.

Turning to FIG. 2, a communication system 200 is shown. The system 200 includes the land network 16 and call center 20 described above, but also includes a land network automatic location identification (ALI) database 202, a local exchange carrier (LEC) ALI database 204, a PSAP location service 206, an emergency gateway 208, a selective router 210, a voice channel connection 212 between the call center 20 and the land network 16, a data channel connection 214 between the call center 20 and the land network 16, an identified PSAP 216, and other wired or wireless carrier systems 218 similar in scope and function as the wireless carrier system 14 and/or land network 16. It should be appreciated that in other embodiments, the land network 16 can be substituted with a wireless carrier system 14 other system capable of providing E911 service as is known to those skilled in the art.

Public service access point (PSAP) generally refers to an agency responsible for handling 911 calls for emergency assistance from police, fire, or ambulance services. Over 8,000 PSAPs exist in the U.S. and each is responsible for handling emergency calls in a particular Emergency Service Zone. An emergency service zone (ESZ) is a geographic zone associated with a unique PSAP. The ESZ enables the routing of emergency calls to the PSAP responsible for the caller's area. The ESZ can be the range of latitude and longitude coordinates that define the boundaries of a particular ESZ. Each PSAP and its corresponding ESZ can then be stored in a Telematics PSAP database. The PSAP can also be linked to an Automatic Location Identification (ALI) database. In the embodiment shown in FIG. 2, two ALI databases are shown, the land network ALI database 202 and the LEC ALI database 204. Both ALI databases 202, 204 are capable of relating a specific telephone number to a location or address. The ALI databases 202, 204 can accept a PSAP query with a telephone number and respond with an address or location. In other cases, the ALI can also store location information, such as latitude and longitude coordinates.

The PSAP location service 206 can help identify an appropriate PSAP to contact if a vehicle occupant or wireless user requests emergency assistance. The PSAP location service 206 can be linked to the call center 20 via the wireless network 14 or the land network 16. Additionally, the call center 20 could implement the PSAP location service 206 using the servers 82 and databases 84 described above.

The emergency gateway 208 is shown connected to the land network 16. The emergency gateway 208 works with the selective router 210 to receive requests for emergency services from the call center 20. Both the gateway 208 and router 210 can be parts of a wireline enhanced E911 network. In one example, the gateway 208 is a software application capable of managing telematics device or wireless telephone numbers and location data. The selective router 210 can act as a tandem switch in the E911 network. The selective router 210 is connected, by E911 trunks, to end office switches in the geographical area served by the router 210. The selective router 210 is also connected by E911 trunks to the PSAPs served by the router 210. The selective router 210 can route an emergency calls to a PSAP based on a P-ANI of the emergency call placed by the vehicle 12.

The voice channel connection 212 and data channel connection 214 each connect the call center 20 to the land network 16 and independently communicate voice transmissions and data transmissions to an identified PSAP 216. The voice channel connection 212 can communicate the voice of the caller at a vehicle 12, a call advisor 86, and/or an emergency operator at the identified PSAP 216. The communication over the voice channel connection 212 can be initiated using a direct inward dialing (DID) number associated with the identified PSAP 216. A DID number can correspond to public telephone numbers or can be seven digit numbers that are capable of directing voice communication to the identified PSAP 216. The communication over the voice channel connection can be initiated with a pseudo automatic number information (P-ANI) and/or the DID number. The P-ANI can be a number, consisting of the same number of digits as a standard ANI number, that is not a North American Numbering Plan telephone directory number and may be used in place of the standard ANI number to convey special meaning. The special meaning assigned to the pseudo-ANI is determined by agreements, as necessary, between the system originating the call, intermediate systems handling and routing the call, and the destination system.

The data channel connection 214, such as a low-power data connection, can transmit data such as the DID number, the P-ANI, and/or the location of the vehicle 12 to the identified PSAP 216. The voice channel connection 212 and/or the data channel connection 214 can be provided by the land network 16. While providing separate communications, the connections 212, 214 can be physically located closely together, such as bundled within a single sheath or located separately.

Figure 3:
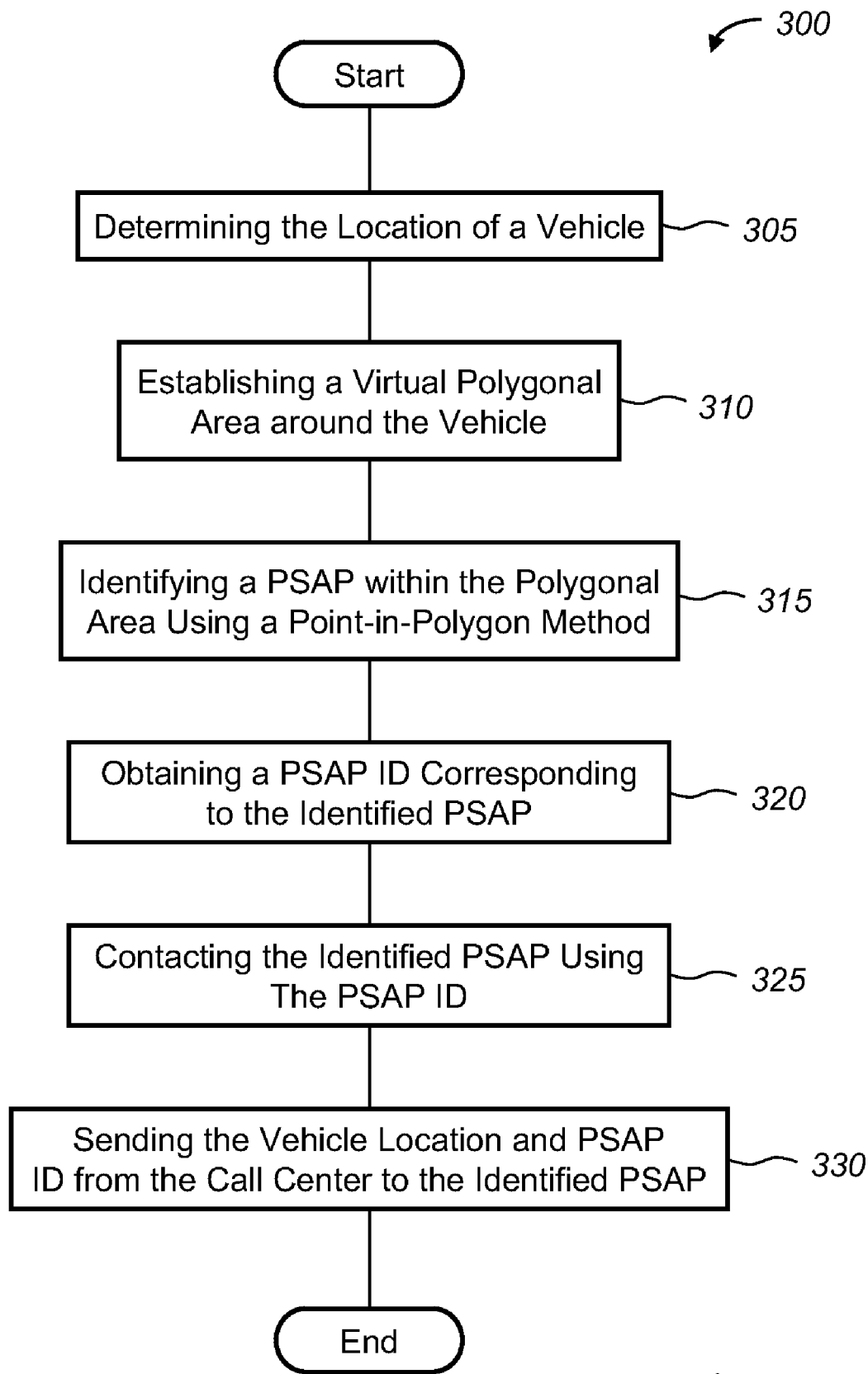
FIG. 3 is a flow chart depicting an exemplary embodiment of the method disclosed herein.

Turning now to FIG. 3, there is shown an exemplary embodiment of a method of contacting a public safety answering point (PSAP). The method 300 begins with step 305, determining the location of a vehicle. Vehicle location can be determined several ways. For example, the call center 20 can receive location-based information from the vehicle. This information can include latitude and longitude coordinates determined by the GPS module 40. Other location-based information can be obtained by dead reckoning methods. Dead reckoning methods involve using a previously-known position to derive a present position based on the speed and direction of the vehicle. The speed and direction of the vehicle can be determined using the GPS module 40 and/or VSMs 42. After obtaining the vehicle location, the call center 20 can determine an appropriate PSAP to contact. The identified PSAP 216 usually is one nearest the vehicle 12, but this isn't always the case. Other considerations can be a factor, such as an ability of the identified PSAP 216 to respond to the request of the vehicle 12. The method 300 proceeds to step 310.

At step 310, a virtual polygonal area is established around the location of the vehicle. The virtual polygonal area can vary in shape and size or can be fixed. Given that locations of PSAP(s) are known, the area within the virtual polygonal area is searched for available PSAPs. If no PSAPs are located within the virtual polygonal area, the size and dimensions of the virtual polygonal area can be changed (e.g. increased) and the search repeated. The virtual polygonal area can be defined and/or established at the call center 20 or the vehicle 12 as a number of latitude and longitude coordinates as points that define the virtual polygonal area. In one example, the virtual polygonal area can be defined by three pairs of latitude and longitude coordinates. The method 300 proceeds to step 315.

At step 315, one or more PSAPs are identified within the established virtual polygonal area using a point in polygon method. For instance, the PSAP location service 206 shown in FIG. 2 can determine an appropriate PSAP to contact based on the location of the vehicle 12. Using the location of the vehicle, such as the latitude and longitude coordinates, the PSAP location service 206 can use a point-in-polygon method to determine the identified PSAP(s) 206. The point-in-polygon method involves establishing the virtual polygonal area around the latitude and longitude coordinates of the vehicle 12. Simply put, this method involves determining whether a particular point is inside or outside of the virtual polygonal area. Several methods can be used to implement this method. Examples include a ray casting algorithm or a winding number algorithm. The ray casting algorithm tests the number of times a ray, originating from the location of a PSAP intersects the boundaries of the virtual polygonal area. Depending on the location of a PSAP and the shape of the virtual polygonal area, the ray may traverse the boundary of the polygon several times. If the ray traverses the boundaries of the virtual polygonal area an even number of times, the location of the PSAP is outside of the virtual polygonal area. Similarly, if the ray traverses the boundaries of the virtual polygonal area an odd number of times, the location of the PSAP in within the virtual polygonal area. In another example, the winding number algorithm can use the winding number of a PSAP with respect to the virtual polygonal area to determine whether the boundary of the virtual polygonal area encloses the PSAP. If the winding number of a PSAP with respect to the virtual polygonal area is zero, the PSAP is located outside of the virtual polygonal area. Similarly, if the winding number of the PSAP with respect to the virtual polygonal area is non-zero, it can be determined that the PSAP is located within the virtual polygonal area. The method 300 proceeds to step 320.

Step 320 involves obtaining a PSAP identification (ID) corresponding to the identified PSAP(s). After identifying the PSAP(s) the PSAP location service 206 shown in FIG. 2 can provide a PSAP ID for the identified PSAP(s). The PSAP location service 206 can maintain a database that includes PSAP IDs for all of the PSAPs for which it has data. A PSAP ID can be a DID number that can enable a call center 20 to contact the identified PSAP. The call center 20 can dial the DID number through the land network 16, which can pass the request through the emergency gateway 208 and the selective router 210. Instead of or in addition to the DID number, the PSAP ID can be a P-ANI that aids in routing the call from the call center 20 to the identified PSAP. The method proceeds to step 325.

At step 325, the identified PSAP(s) is contacted using the PSAP ID. For instance, the call center can contact the identified PSAP over the data channel connection 214 by using the PSAP ID, such as a DID number. As described above, a live advisor can contact the identified PSAP 216 using the PSAP ID and communicate between the occupant(s) of a vehicle 12 and the identified PSAP 216. In this situation, the live advisor 86 at the call center 20 can communicate with both the vehicle occupants and the identified PSAP 216 or can withdraw to allow the identified PSAP 216 and the vehicle occupants to communicate without assistance from the call advisor 86. The method 300 proceeds to step 330.

At step 330, the vehicle location and PSAP ID is sent from the call center to the identified PSAP(s). For instance, the call center 20 can also send data obtained from the vehicle 12 and/or the PSAP location service 206 and pass that data to the identified PSAP 216 using the data channel connection 214. This data can include the DID number of the identified PSAP, the P-ANI of the identified PSAP 216, or the location of the vehicle 12. And any of the described data can be sent via the data channel connection 214 to the identified PSAP 216 through the wireless network 14 or the land network 16. The method 300 then ends.

The method described herein can help direct emergency requests from wireless users or telematics subscribers to emergency operators bypassing the administrative trunk line. In addition, the call center can make use of the voice and data connections between the call center and the telematics unit to provide additional information to the PSAP. And the method results in a verified emergency call process for wireless or telematics devices through priority or 911 trunk lines and existing E911 process call flows.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of contacting a public safety answering point (PSAP), the steps comprising:
   (a) determining the location of a vehicle;
   (b) communicating the location of the vehicle to a PSAP location service;
   (c) identifying a PSAP proximate to the location of the vehicle;
   (d) determining a direct inward dialing (DID) number associated with the identified PSAP at the PSAP location service, wherein the DID number corresponds to a public telephone number or a seven digit number capable of directing voice communications to the identified PSAP;
   (e) communicating the DID number to a call center from the PSAP location service;
   (f) contacting the identified PSAP from the call center using the DID number; and
   (g) transmitting a pseudo automatic number identifier (P-ANI), the DID number of the identified PSAP and the location of the vehicle from the call center to the PSAP.

2. The method of claim 1, wherein step (a) further comprises generating latitude and longitude coordinates that represent the location of the vehicle.

3. The method of claim 1, wherein steps (b), (e), and (g) further comprise communicating data over a data channel connection between the call center and the PSAP.

4. The method of claim 1, wherein step (c) further comprises using a point-in-polygon method to identify one or more PSAPs.

5. The method of claim 4, wherein the point-in-polygon method further comprises the step of establishing a virtual polygonal area around the location of the vehicle.

6. The method of claim 5, wherein the virtual polygonal area is at least partially defined by three or more pairs of latitude and longitude coordinates.

7. The method of claim 5, further comprising the steps of:
searching the virtual polygonal area and if no PSAPs are located within the virtual polygonal area, increasing the area of the virtual polygonal area and searching the virtual polygonal area a second time.

8. The method of claim 4, wherein the point-in-polygon method further comprises a ray casting algorithm or a winding number algorithm.

9. A method of contacting a public safety answering point (PSAP), the steps comprising:
(a) determining the latitude and longitude coordinates of a vehicle;
(b) establishing a virtual polygonal area surrounding the vehicle based on the latitude and longitude coordinates of the vehicle, wherein the point-in-polygon search method further comprises searching the virtual polygonal area and if no PSAPs are located within the virtual polygonal area, the area of the virtual polygonal area is increased and the virtual polygonal area is searched a second time;
(c) locating one or more PSAPs within the polygonal area using a point-in-polygon search method;
(d) obtaining a direct inward dialing (DID) number for each located PSAP using a PSAP location service;
(e) sending the DID from the PSAP location service to one or more of a primary carrier or a call center; and
(f) connecting the call center to one of the PSAPs within the polygonal area.

10. The method of claim 9, wherein the point-in-polygon method further comprises a ray casting algorithm or a winding number algorithm.

11. The method of claim 9, wherein step (e) is carried out using a data channel connection and step (f) is carried out using a voice channel connection.

12. A method of contacting a public safety answering point (PSAP), the steps comprising:
(a) determining the latitude and longitude coordinates of a vehicle;
(b) identifying a PSAP within a predetermined range of the latitude and longitude coordinates;
(c) calling a direct inward dialing (DID) number corresponding to the identified PSAP, wherein the DID number corresponds to a public telephone number or a seven digit number capable of directing voice communications to the identified PSAP;
(d) transmitting voice communications and a pseudo automatic number identification (P-ANI) corresponding to the identified PSAP from a call center using a voice channel based on the called DID number;
(e) sending a notification to a wireless carrier of the DID number corresponding to the identified PSAP, the transmitted P-ANI, and the latitude and longitude of the vehicle from the call center using a data channel; and
(f) receiving the notification at the wireless carrier.

13. The method of claim 12, wherein identifying in step (b) further comprises using a point-in-polygon method.

14. The method of claim 13, wherein the point-in-polygon method further comprises the step of establishing a virtual polygonal area around the latitude and longitude coordinates of the vehicle.

15. The method of claim 14, wherein the virtual polygonal area is at least partially defined by three or more pairs of latitude and longitude coordinates.

16. The method of claim 14, further comprising the steps of:
searching the virtual polygonal area and if no PSAPs are located within the virtual polygonal area, increasing the area of the virtual polygonal area and searching the virtual polygonal area a second time.

17. The method of claim 14, wherein the point-in-polygon method is carried out at a call center.

18. The method of claim 13, wherein the point-in-polygon method further comprises a ray casting algorithm or a winding number algorithm.

* * * * *